(12) United States Patent
Juergensen et al.

(10) Patent No.: US 10,599,112 B2
(45) Date of Patent: Mar. 24, 2020

(54) METHOD FOR PROGRAMMING AND CONFIGURING A DEVICE IN A TRACEABLE MANNER

(71) Applicant: Schneider Electric Automation GmbH, Marktheidenfeld (DE)

(72) Inventors: Leif Juergensen, Waldbrunn (DE); Rainer Beudert, Eisingen (DE)

(73) Assignee: Schneider Electric Automation GmbH, Marktheidenfeld (DE)

( * ) Notice: Subject to any disclaimer, the term of this patent is extended or adjusted under 35 U.S.C. 154(b) by 202 days.

(21) Appl. No.: 15/532,838

(22) PCT Filed: Dec. 3, 2015

(86) PCT No.: PCT/EP2015/078518
§ 371 (c)(1),
(2) Date: Jun. 2, 2017

(87) PCT Pub. No.: WO2016/087585
PCT Pub. Date: Jun. 9, 2016

(65) Prior Publication Data
US 2018/0150044 A1   May 31, 2018

(30) Foreign Application Priority Data
Dec. 5, 2014   (DE) .......................... 10 2014 118 042

(51) Int. Cl.
*G06F 9/44*   (2018.01)
*G05B 19/042*   (2006.01)
(Continued)

(52) U.S. Cl.
CPC ............. *G05B 19/042* (2013.01); *G06F 8/61* (2013.01); *G06F 8/71* (2013.01); *G05B 2219/25092* (2013.01); *G06F 8/41* (2013.01)

(58) Field of Classification Search
CPC ....................................................... G06F 9/44
See application file for complete search history.

(56) References Cited

U.S. PATENT DOCUMENTS

2003/0196187 A1* 10/2003 Kodosky ............. G06F 8/34
                                                               717/109
2007/0028227 A1*  2/2007 Lebowitz ............ G06F 8/20
                                                               717/168
(Continued)

FOREIGN PATENT DOCUMENTS

WO   WO 2011/131019 A1   10/2011
WO   WO 2013/130588 A1    9/2013

OTHER PUBLICATIONS

International Search Report dated Apr. 13, 2016 in PCT/EP2015/078518.

(Continued)

*Primary Examiner* — Jae U Jeon
(74) *Attorney, Agent, or Firm* — Oblon, McClelland, Maier & Neustadt, L.L.P.

(57) ABSTRACT

The invention relates to a method for the traceable programming and/or configuration of a device, in particular of an embedded device, in which
a) data are transmitted to the device from a programming system, with the transmitted data including code executable by the device and being generated from source code;
b) a first unique identifier is produced on the basis of at least some of the transmitted data and of at least some of the source code and of an identification of the device;
c) the first unique identifier is stored in the device; and
d) at least the transmitted data used for the first unique identifier, the source code used for the first unique identifier, and the first unique identifier are stored in a memory device independent of the device.

10 Claims, 2 Drawing Sheets

Figure 1:
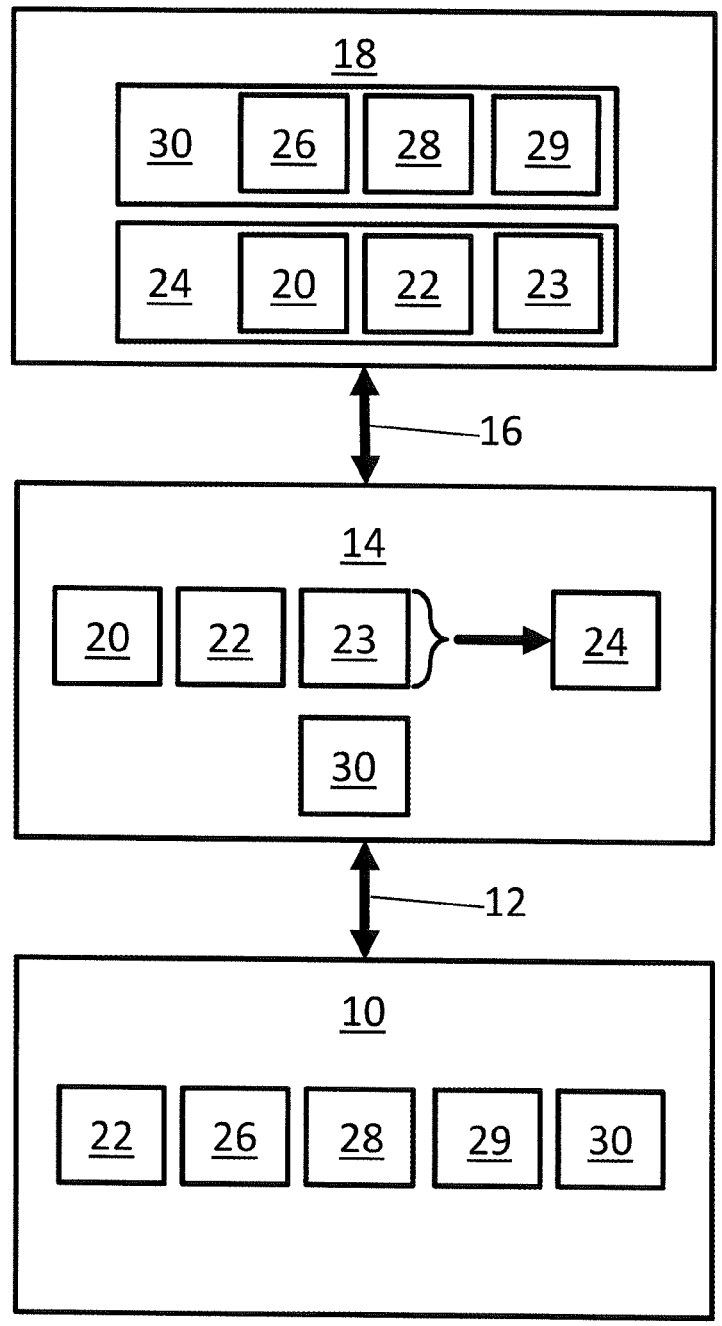

(51) Int. Cl.
*G06F 8/61* (2018.01)
*G06F 8/71* (2018.01)
*G06F 8/41* (2018.01)

(56) References Cited

U.S. PATENT DOCUMENTS

| | | | |
|---|---|---|---|
| 2010/0257345 A1* | 10/2010 | Tazzari | G06F 8/654 |
| | | | 713/1 |
| 2010/0293373 A1 | 11/2010 | McBrearty et al. | |
| 2011/0265077 A1 | 10/2011 | Collison et al. | |
| 2012/0180024 A1* | 7/2012 | Gonzalez | G06F 8/71 |
| | | | 717/109 |
| 2013/0036409 A1* | 2/2013 | Auerbach | G06F 8/456 |
| | | | 717/140 |
| 2013/0287208 A1 | 10/2013 | Chong et al. | |
| 2013/0332657 A1 | 12/2013 | Kandiraju et al. | |
| 2013/0343266 A1 | 12/2013 | Hallsten et al. | |
| 2014/0058532 A1* | 2/2014 | Das | G05B 19/0426 |
| | | | 700/1 |
| 2014/0114497 A1 | 4/2014 | Miyake | |
| 2014/0136496 A1 | 5/2014 | Kuo | |
| 2016/0098591 A1* | 4/2016 | Li | H04L 63/08 |
| | | | 382/119 |

OTHER PUBLICATIONS

International Preliminary Report on Patentability and Written Opinion dated Jun. 22, 2017 in PCT/EP2015/078518.

\* cited by examiner

METHOD FOR PROGRAMMING AND CONFIGURING A DEVICE IN A TRACEABLE MANNER

The present invention relates to a method for a traceable programming and configuring of a device, in particular of an embedded device.

Embedded devices such as programmable logic controllers (PLCs) or programmable controllers in general such as servo drives and frequency converters are used in a large number of applications and, for example, control automated processes in industrial machines or robots. In this connection, an embedded device can also be called a device.

In the development of software and firmware for such devices, a plurality of developers typically work on the preparation of the application for a device. During parallel work in projects, discrepancies can easily occur in the synchronization of the software versions. Counter-measures have therefore been taken to avoid inconsistent software versions. Version management systems are e.g. used for this purpose with which it is possible to track which developer prepared which version of the software. In addition, standard operating procedures (SOPs) are used to avoid unwanted conflicts between a plurality of different versions of the software or firmware.

It has, however, frequently been shown in practice that the consistency of the software produced or of the source code of the software cannot be guaranteed despite the version management systems and the standard operating procedures. The prepared software in particular has to be downloaded to the embedded device in the development of software and firmware for embedded devices. The source code is frequently likewise downloaded onto the embedded device to create a relationship between the software located on the embedded device, that is present as executable code (executable) there, and the associated source code.

If the executable code is now only downloaded onto the embedded device after the preparation of a new software version, a discrepancy arises between the source code present on the embedded device and the executable code present there. This discrepancy can propagate in the further development process of the software and can result in errors and inconsistencies in the development process.

When embedded devices are shipped to customers, the devices are typically equipped with the respective latest software. To be able to trace which shipped device has which software version, manually managed databases are used, for example. Due to the manual management it is not possible to guarantee that the databases are correct and up-to-date. This is in particular the case when the software versions of the embedded devices are retroactively amended, e.g. by a service technician, and if the amendment information is not transferred to the version management program.

With embedded devices for automation technology, a so-called "online change" or a hot code swapping" is frequently also possible, i.e. the application code is e.g. changed in operation of the device during servicing. A consistent tracing of the respective executable code present on a device and of the source code is thus additionally made more difficult.

It is therefore the underlying object of the invention to provide methods for a traceable development of software and firmware that cover all the sections of a life cycle of the software and firmware.

This object is satisfied by the methods in accordance with the independent claims.

In accordance with the invention, a method is provided for the traceable programming of a device, in particular of an embedded device, in which
a) data are transmitted to the device from a programming system, with the transmitted data including code executable by the device and being generated from source code;
b) a first unique identifier is produced on the basis of at least some of the transmitted data and of at least some of the source code and of an identification of the device;
c) the first unique identifier is stored in the device; and
d) at least the transmitted data used for the first unique identifier, the source code used for the first unique identifier, and the first unique identifier are stored in a memory device independent of the device.

It is the underlying recognition of the invention that the executable code present on a specific device and the associated source code can be identified in a simple manner by the generation of the first unique identifier. Due to the storing of the executable code and of the source code in the independent memory device together with the first unique identifier, it is additionally ensured that it is possible to determine, independently of an access to the device, which executable code and which source code are linked to which unique identifier. Since the identification of the device is likewise entered into the first unique identifier, which software version and/or which firmware version, i.e. which executable code, is present on a specific device can also be traced using the data stored in the memory device. In addition, the identification of the device can also be stored in the memory device.

The method can advantageously be carried out in an automated manner on the downloading of executable code to a device. As a result, human error in the management of the data on the memory device can be excluded.

The first unique identifier can be generated either by the device or by the programming system. The device is preferably an embedded device, that is, for example, a programmable logic controller (PCL) that e.g. controls a plurality of electrical actuators. The devices can also, for example, be human machine interfaces (HMIs), energy measuring systems, distributed control systems (DCS'), frequency converters and/or heating controls or the like.

The programming system can generate executable code from the source code by compiling, linking and locating. In comparison with the previously customary procedures, only the executable can be transmitted to the device by the programming system. A downloading of source code onto the device is no longer absolutely necessary since the linking of the source code to the executable code is possibly via the first unique identifier stored in the memory device. Storage space on the device can be saved in this manner, whereby the device is less expensive and thus more economic in manufacture. In addition, the time effort for the data transmission to the device can be reduced since a transmission of the frequently extensive source code is no longer necessary. The time effort and thus the development costs for the software and firmware can likewise be reduced in this manner.

Further advantageous developments of the invention can be seen from the description, from the dependent claims and from the drawings.

In accordance with a first advantageous embodiment, the first unique identifier is also generated by the use of a hash function. The hash function can also be called a trapdoor function or a one-way function. The first unique identifier can therefore comprise a hash value that is generated by applying the hash function to the source code, to the executable code and to the identification of the device. The hash function can, for example, be the SHA256 function, the MD4 function or the MD5 function.

Instead of the hash function, or additionally, a digit sum or a data parity or a combination of a plurality of methods can be used as a first unique identifier.

Alternatively or additionally, the first unique identifier can also comprise a URI (uniform resource identifier) or a URL (uniform resource locator), in particular an http link. The http link can point to the memory device in which the transmitted data, the source code and the first unique identifier are stored.

It is of advantage on the use of a hash function that the integrity of the data stored together with the first unique identifier can be checked. A hash value generated by the hash function would also change due to a subsequent change of the stored data, whereby the first unique identifier is also changed. Such a change can therefore be determined by the repeat application of the hash function to the stored data. In particular in the manufacture of medicines and foodstuffs, the strict demands on the traceability of production processes that apply there can be satisfied in a safe manner.

In accordance with a further advantageous embodiment, the first unique identifier is generated on the basis of firmware transmitted to the device and/or on the basis of a configuration transmitted to the device. Which firmware and/or which configuration is/are present on a specific device can thus be traced by means of the first unique identifier. It is consequently possible to directly identify devices having obsolete firmware, for example, and to update them to the respective current firmware as part of service work. The respective current firmware and the transmitted configuration can also be uploaded to the memory device for this purpose.

In accordance with a further advantageous embodiment, the first unique identifier is also generated on the basis of an executable application file transmitted to the device and/or on the basis of parameters transmitted to the device. In this manner, the respective applications executed by the devices as well as the parameters used for this purpose can also be traced. The application file and the parameters can be stored in the memory device for this purpose.

The executable application file in this respect represents the user application executed by the device, with the user application accessing the functions of the device provided by the firmware. The firmware can thus be the operating system of the device whose functionality can be set by means of the configuration. The user application can also be called the software or the application code.

The first unique identifier is preferably also generated on the basis of a second unique identifier that is based on a source code generated by the programming system and on at least one executable code generated from the source code. The executable code can in this respect be an application file. The second unique identifier is e.g. likewise generated by means of a hash method, with the hash function used for this purpose using the source code and the application field generated (compiled) therefrom as the input.

In addition, the second unique identifier can also be generated on the basis of an identification of the programming system. The identification of the programming system can, for example, be the serial number of the computer used, the name of the programmer, a license code of the software used, and the like.

The first unique identifier is further preferably generated such that the second unique identifier can be determined from the first unique identifier. For this purpose, the second unique identifier can be appended to the first unique identifier, for example. Alternatively, a hash function can be used from which the second unique identifier can also continue to be determined after using the hash function.

It is thus possible by the combination of the two unique identifiers additionally to find out the programming system and/or the developer from which/from whom the code present on a specific device originates. For example, on the occurrence of errors in the devices, a complete tracing of the programming system used and of the source code can then take place.

In accordance with a further advantageous embodiment, the identification of the device and/or of the programming system is a MAC address (media access control address) and/or a serial number of a storage medium and/or a serial number of a CPU (central processing unit) and/or another unique identification of the device or of the programming system. The identification of the device and of the programming system can thus be based on information that is unique. In this respect, the identification of the device can preferably take place via the storage medium so that the exchange of the CPU is possible without problem in the device. Such an exchange of the CPU is typically carried out for process controls in embedded devices.

The memory device is particularly preferably a server arranged remote from the programming system to which the transmitted data and the first unique identifier are in particular transferred by means of an internet protocol. Due to the transmission of the data to the remote server, a central database can be created in the server that, for example, provides information on the code present on all the devices of a corporation and on the associated code versions. An overview of all the devices and of their code versions or application versions is thus in particular provided in a simple manner for large corporations that have a plurality of devices in use. The transmission of the data to the server can take place fully automatically so that the currentness of the data stored on the server can be ensured. The data are in particular transmitted by the programming system to the server as soon as the programming system can establish a data connection to the server.

It is advantageous on the use of the server that storage space on the server only causes small costs. The source code on the basis of which the data transmitted to the respective device are generated can in particular also be stored on the server. It is consequently no longer necessary also to store the source code on the device, whereby storage is in turn saved on the device.

The server can additionally have a rights management, whereby partitioned storage sectors for different customers of a corporation or for different departments can be prepared, for example. The data on the server can additionally be present in encrypted form, with the first unique identifier being able to serve as the basis for the encryption.

The invention furthermore relates to a method for the traceable generation of code, in particular of application code or executable code for embedded devices in which
a) a source code is converted (compiled) into executable code;
b) the source code and the executable code are used for generating a second unique identifier; and
c) the source code, the executable code and the second unique identifier are stored in a remote memory device.

The executable code can be a device application or firmware. They can be created by compiling, linking and locating the source code. All the method steps can in this respect be carried out automatically, whereby a database with source code, executable code and the respective associated second unique identifiers is created in the remote memory device. As a consequence, an overview of all the versions of the source code and of the executable code generated therefrom is possible. An overview of the different versions of the source code can in particular be preserved in this manner in larger development projects with a plurality of developers. The developers can also download the respective latest version of the source code from the remote memory device. The method in accordance with the invention can thus serve as a replacement for software version management systems or as a supplement.

In accordance with an advantageous embodiment, the executable code comprises all the artifacts required for execution on a device. The executable code thus, for example, includes configuration files, parameters, libraries such as dynamic link libraries (DLLs), and the like. No existing data are thus required on the device to enable the performance of the firmware and/or of a user program or of an application code.

The invention furthermore relates to a method for the traceable change of the programming of a device, in particular of an embedded device, in which
a) a data connection of a programming system to the device is established;
b) a first unique identifier is transmitted by the device to the programming system or is generated by the programming system;
c) the programming system transmits the first unique identifier to an independent memory device;
d) the independent memory device transmits at least the data stored in the memory device with respect to the first unique identifier to the programming system, with the data at least comprising a source code;
e) the data received by the memory device are changed by means of the programming system;
f) data are transmitted to the device from the programming system, with the transmitted data including code executable by the device and being generated from the changed source code;
g) a new first unique identifier is generated that is based on at least some of the transmitted data and on at least some of the changed source code as well as on an identification of the device;
h) the new first unique identifier is stored in the device; and
i) the transmitted data and the new first unique identifier are stored in the independent memory device.

The communication with the memory device can take place, for example, by means of a data connection, in particular over the internet. A secured, encrypted connection can optionally be used for this purpose, with the programming system communicating with the memory device. The device can alternatively also receive the source code directly from the memory device and forward it to the programming system. The memory device can be a server having a so-called cloud storage that is arranged separately from the device and from the programming system.

It is of advantage in the method in accordance with the invention for the traceable changing of the programming of a device that the first unique identifier indicates which executable code is present on the respective device so that work can be continued in the further development of the code using the respective version present on the device. The consistency of different versions can thus be ensured.

The change of the source code and thus also the change of the executable code are taken into account by the generation of a new first unique identifier. The changes can be traced in the memory device using the storage of the new first unique identifier in the memory device. The further development of the source code is thus transparent and is traceable in a simple manner.

In another respect, the statements apply that were made on the method for the traceable programming of a device and on the method for the traceable generation of code.

The methods in accordance with the invention are generally not only suitable for the programming of embedded devices, but also for the preparation of any software, for example on personal computers (PCs) or servers.

Figure 2:
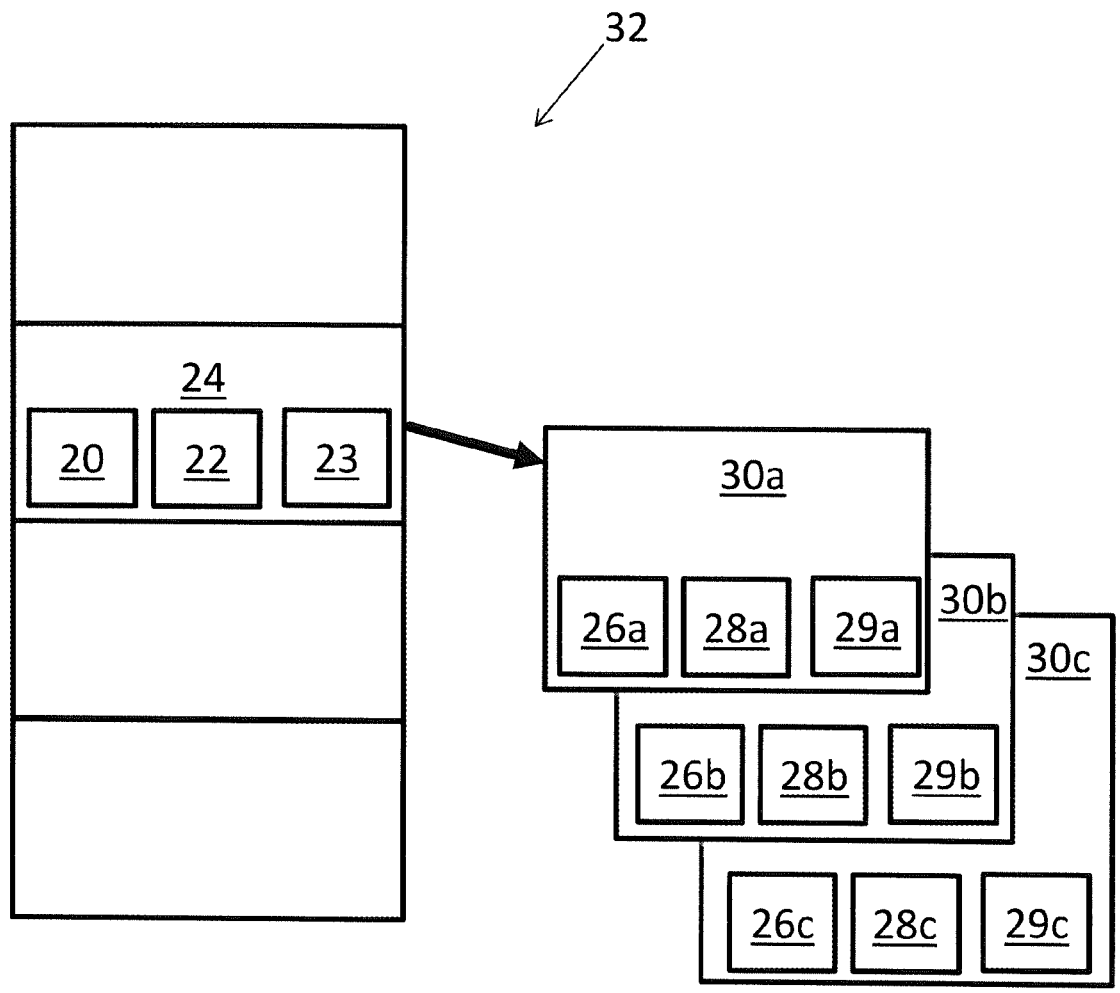

The invention will be described in the following purely by way of example with reference to the drawings. There are shown:

FIG. 1 a schematic view of the interaction of the device, the programming system and the memory device; and FIG. 2 a data structure of the memory device in a schematic view.

FIG. 1 schematically shows a device that is a programmable logic controller (PLC) 10. The PLC 10 is connected by means of a data connection 12 to a programming system 14 that serves as the programming system. The data connection 12 is an Ethernet connection by means of a local area network (LAN). The programming system 14 is in turn connected to a cloud server 18 via an Internet connection 16.

For programming the PLC 10, a source code 20 is first prepared on the programming system 14 that is converted by a programming environment (not shown) into an executable code, i.e. into an executable 22. After the preparation of the executable 22, a second unique identifier 24 is generated from the source code 20, from the executable 22 and from a serial number 23 of the programming system 14. Any other identification of the programming system 14 can also be used instead of the serial number 23 of the programming system 14.

The second unique identifier 24, the source code 20, the executable 22 and the serial number 23 of the programming system 14 are then transmitted to the cloud server 18 and are saved there. On the storage in the cloud server 18, the second unique identifier 24 serves for the association of the data stored in the cloud server 18 with a respective programming system 14.

The executable 22 is subsequently transmitted to the PLC 10 by means of the data connection 12. The executable 22 in this respect comprises a user application. The user application is executed by the PLC 10 while taking account of a configuration 26 prepared by the programming system 14 and likewise transmitted to the PLC 10 and of firmware 28 of the PLC 10.

The user application of the executable 22 can, for example, comprise a motor control for a plant processing food. The PLC 10 has a fieldbus interface (not shown for controlling the connected motors.

The programming system 14 subsequently generates a first unique identifier 30 from the source code 20, the executable 22, the second unique identifier 24, the configuration 26, the firmware 28 and a serial number 29 of a memory card (not shown) of the PLC 10. The first unique identifier 30 is in this respect generated by means of a hash function such that the second unique identifier 24 can be determined from the first unique identifier 30. The first unique identifier 30 is transmitted to the PLC 10 and is saved there.

In addition, the first unique identifier 30 is transmitted together with the configuration 26, the firmware 28 and the serial number 29 of the memory card to the cloud server 18 and is stored there.

FIG. 2 shows a data structure 32 in accordance with which data are stored in the cloud server 18. The data entries of the data structure 32 are in this respect first ordered in accordance with the second unique identifier 24, with a single second unique identifier 24 being shown by way of example in FIG. 2. The data entries generally form instances of source code 20, executable 22, and the second unique identifier 24.

The second unique identifier 24 in this respect represents a specific combination of source code 20, executable 22, and programming system 14, with the programming system 14 being represented by the serial number 23 of the programming system 14. All the first unique identifiers 30 based on the same source code 20 and on the same executable 22 are linked to the entry for the second unique identifier 24 in the data structure 32. Three first unique identifiers 30a, 30b, 30c are shown by way of example in FIG. 2 that were each generated by transmitting the executable 22 belonging to the second unique identifier 24 to different devices. The respective configuration 26a, 26b, 26c and the firmware 28a, 28b, 28c used on the respective PLC 10 are stored together with the respective first unique identifier 30a, 30b, 30c. The respective serial number 29a, 29b, 29c of the memory card of the respective PLC 10 is likewise saved.

It can thus be determined in a simple manner with reference to the data structure 32 and in particular on the basis of the serial number 29a, 29b, 29c of the memory card which source code 20 is used on which PLC 10 with which configuration and with which firmware 28. An overview of the software versions present on the respective devices can thus be preserved even with large development projects with a large number of involved developers and with a plurality of PLC devices 10 used.

REFERENCE NUMERAL LIST

10 PLC
12 data connection
14 programming system
16 internet connection
18 cloud server
20 source code
22 executable
23 serial number of the programming system
24 second unique identifier
26 configuration
28 firmware
29 serial number of the memory card
30 first unique identifier
32 data structure

The invention claimed is:

1. A method for the traceable programming and/or configuring of at least one embedded device, the method comprising:
(a) transmitting, from a programming system, data to a plurality of embedded devices, with the transmitted data including code executable by each of the devices and being generated from a source code;
(b) producing, by the programming system, a first unique identifier by use of a hash function on the basis of at least some of the transmitted data and of at least some of the source code and of an identification of each of the plurality of devices, such that a different first unique identifier is generated for each of the plurality of embedded devices;
(c) transmitting, by the programming system, the first unique identifier to each of the plurality of embedded devices and storing, by each of the embedded devices, the respective first unique identifier at a respective embedded device; and
(d) storing at least the transmitted data used for the first unique identifier, the source code used for the first unique identifier, and the first unique identifier are stored in a memory device independent of the device which is a server arranged remote from the programming system.

2. The method in accordance with claim 1,
wherein each respective first unique identifier is generated on the basis of firmware transmitted to each of the embedded devices.

3. The method in accordance with claim 1,
wherein each respective first unique identifier is generated on the basis of a configuration transmitted to each of the embedded devices.

4. The method in accordance with claim 1,
wherein each respective first unique identifier is also based on an executable application file transmitted to each of the embedded devices.

5. The method in accordance with claim 1,
wherein each respective first unique identifier is also based on parameters transmitted to each of the embedded devices.

6. The method in accordance with claim 1,
wherein each respective first unique identifier is also based on a second unique identifier that is based on a source code generated on the programming system and on at least one executable code generated from the source code.

7. The method in accordance with claim 6,
wherein each respective first unique identifier is generated such that the second unique identifier can be determined from the first unique identifier.

8. The method in accordance with claim 1,
wherein the identification of at least one of the embedded devices and of the programming system is at least one of a MAC address, a serial number of a storage medium, a serial number of a CPU, and another unique identification of one of the device and the programming system.

9. The method in accordance with claim 1, wherein the transmitted data and each respective first unique identifier are transferred to the memory device by means of an internet protocol.

10. A method for the traceable changing of the programming of at least one embedded device, the method comprising:
(a) establishing a data connection of a programming system to a plurality of embedded devices;
(b) transmitting a first unique identifier to the programming system by the device by each of the plurality of embedded devices or generating the first unique identifier for each of the plurality of embedded devices by the programming system such that a different first unique identifier is transmitted or generated for each of the plurality of embedded devices;
(c) transmitting, by the programming system, the first unique identifier for each of the plurality of embedded devices to an independent memory device;
(d) transmitting, by the independent memory device at least the data stored in the memory device with respect to the first unique identifier for each of the plurality of embedded devices to the programming system, with the data at least comprising a source code;

(e) changing, by the programming system, the data received by the memory device;
(f) transmitting data to each of the plurality of embedded devices from the programming system, with the transmitted data including code executable by the device and being generated from the changed source code;
(g) generating a new first unique identifier for each of the plurality of embedded devices that is based on at least some of the transmitted data and on at least some of the changed source code as well as on an identification of the respective embedded device;
(h) storing the new first unique identifier in the respective embedded device for each of the plurality of embedded devices; and
(i) storing the transmitted data and the new first unique identifiers in a memory device independent of each of the plurality of embedded devices and of the programming system, the memory device being a server arranged remote from the programming system.

* * * * *